United States Patent Office 3,511,511
Patented May 12, 1970

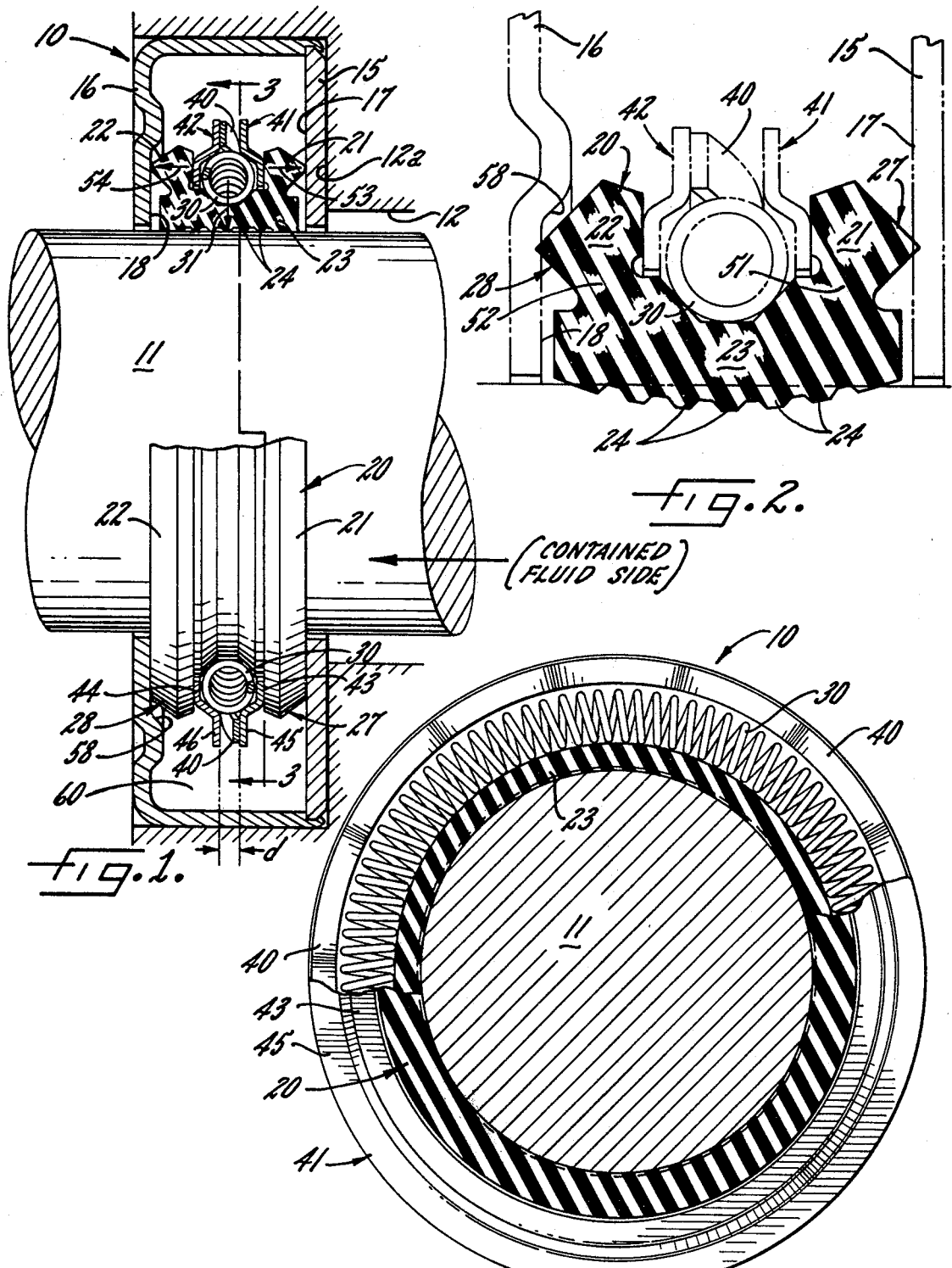

3,511,511
LIP-TYPE CARTRIDGE SEAL HAVING SEPARATE AXIAL AND RADIAL SPRING SYSTEMS
Robert M. Voitik, Glenview, Ill., assignor, by mesne assignments, to Rex Chainbelt Inc., Milwaukee, Wis., a corporation of Wisconsin
Filed Jan. 16, 1968, Ser. No. 698,213
Int. Cl. F16j 15/00, 15/42, 15/34
U.S. Cl. 277—41                                       3 Claims

---

ABSTRACT OF THE DISCLOSURE

A cartridge seal for a shaft in the form of an annulus of rubber or the like gripping the shaft and presenting sealing lips resiliently bearing against a pair of opposed annular surfaces.

---

In prior application Ser. No. 581,486, which was filed Sept. 23, 1966, there is disclosed a lip-type cartridge seal of novel configuration having a garter spring for developing both radial and axial components of force. It is the object of the present invention to provide an improved seal of this general type but which is more ideally suited for high speed operation. It is a related object of the present invention to provide a lip-type cartridge sealing element which tightly grips the shaft to prevent leakage therealong even at high speed and which develops a pressure at the engaging lips which is independent of speed and which may be optimized at a level adequate to produce positive sealing combined with minimum wear and a long useful life. It is a general object of the present invention to provide a lip-type cartridge seal which is highly reliable and efficient but which may be inexpensively manufactured and easily assembled.

Other objects and advantages of the invention will become apparent upon reading the attached detailed description and upon reference to the drawing in which:

FIG. 1 shows a cartridge type seal constructed in accordance with the present invention with the upper portion thereof in axial section.

FIG. 2 is a diagram showing the profile of the annular sealing element of FIG. 1 in its unrestricted state, and FIG. 3 is an axial section taken along the line 3—3 in FIG. 1.

While the invention has been described in connection with a preferred embodiment, it will be understood that I do not intend to be limited to the particular embodiment shown but intend to cover the various alternatives and equivalent constructions included within the spirit and scope of the appended claims.

Turning now to FIG. 1 there is disclosed a cartridge type seal 10 used for the purpose of sealing a shaft 11 with respect to a clearance opening 12. Such clearance opening may, for example, be formed in the wall of a piece of rotating equipment, for example, a pump or motor, where it is desired to preserve a pressure differential between the inside and outside of the equipment or to prevent migration of material such as lubricant or foreign matter in either direction.

The cartridge is made up of a pair of interfitting elements 15, 16, the first being in the form of a disc or annulus and the second in the form of a cup with the elements presenting opposed inner walls 17, 18. Arranged between the walls is a rubber sealing element 20 of annular shape having a central opening of a diameter which is slightly less than the diameter of the shaft to provide a snug fit. The intentional "interference" between the rubber sealing element and the surfaces which it engages is evident in FIG. 2 in which the unrestricted profile is shown diagrammatically and in which the engaged surfaces are shown in dot-dash outline.

In accordance with the present invention the sealing element is formed in a U-shaped cross section with a garter spring seated in the root of the groove and with a wave spring surrounding the garter spring and having washers on each side thereof for pressing axially outward against the walls of the element. The region of connection of the wall portions to the portion which grips the shaft is so shaped and of sufficiently flexible section so that the pressure at the lips is substantially independent of the variations in the squeezing force exerted by the garter spring as a result of centrifugal force incident to changes in shaft speed. Thus referring to the drawing, the sealing element 20, which is in the form of a molded piece of rubber, has wall portions 21, 22 joined by a shaft engaging portion 23. The latter is provided with internal annular ridges 24 to produce regions of concentrated unit pressure further tending to inhibit any leakage of fluid along the surface of the shaft.

Integrally formed on the walls 21, 22 of the sealing element are annular lips 27, 28 which respectively engage the internal surfaces 17, 18 of the cartridge shell.

The garter spring, indicated at 30, is formed of an endless series of spring convolutions so dimensioned as to apply an inward squeezing force directed along the arrow 31.

For applying axial forces in opposite directions, a wave spring 40 is used having force transmitting washers 41, 42. The washers have respective inwardly extending flanges 43, 44 which straddle the garter spring 30 and which transmit axial force to the walls 21, 22 of the sealing element. The washers 41, 42 are preferably of stepped configuration as shown, having flanges 45, 46 which extend radially outward but which are stepped toward one another to produce a nominal distance "d" which is less than the spacing between the flanges 43, 44. The flanges 45, 46 accommodate the wave spring 40 between them in a position which is axially centered with respect to the garter spring 30. The wave spring 40 is preferably chosen to have an axial dimension, when in the free state, on the order of two to four times the nominal spacing "d" between the washers with a spring rate such that the force exerted per lineal inch along the lips is on the order of 0.1 lb. to 0.7 lb. The included angle of the lips is preferably on the order of 90° and the durometer rating of the material is preferably about 70.

The wall portions of the sealing element are flexibly attached to the shaft engaging portion and, as indicated at 51, 52, are of such shape and cross section as to be independent of the garter spring thereby to effectively isolate the two spring systems. Unlike the construction disclosed in the above-identified patent application, the garter spring 30 is effective to apply a squeezing force 31 against the shaft without exerting any substantial axial force against the walls of the sealing element. Conversely, the wave spring and its associated force transmitting washers exert balanced axial forces as indicated by the vectors 53, 54 to produce the desired per unit pressure at the sealing lips free of any radial force in the direction of the shaft. Thus when the shaft revolves at high speed, with centrifugal action tending to reduce the force exerted by the garter spring, such reduction has no effect upon the force which exists at the sealing surfaces. The isolation of the two systems makes it possible for a garter spring 30 to be chosen which is sufficiently strong and which has a sufficiently high spring rate as to remain seated even at the highest speeds of rotation for which the seal is intended while maintaining a unit pressure at the sealing lips which is sufficiently high to insure the integrity of the seal yet sufficiently low so as to insure long wear. For the purpose of lubricating the lips, the cartridge may be loaded with grease in the space 60, substantially full.

It is one of the features of the present construction that a portion of the wall of the cartridge is made of sintered or porous material to prevent unwanted pressure buildup within the cartridge due to heat or for any other reason. Thus I prefer to make the annular element 15 of sintered metal, formed of globular particles in intimate contact but defining continuous minute passageways from the inner wall 17 to the outer wall which is seated against a locating shoulder 12a which surrounds the clearance opening 12. To insure a continuous venting path, the surface 12a should not be intimately sealed to the surface of the sintered element. Normally, the surface of the sintered element will be sufficiently rough as to provide surface escape passages for venting to the clearance opening 12.

As to the degree of porosity which is preferred in the element 15, it is convenient to define this in terms of loss in vacuum in a reference chamber through a predetermined area of the sintered material. Where the reference chamber has a volume of approximately 100 cc. and where the area is that defined by an O-ring having an I.D. of 1/4 inch, a measurement is made of the time required for the vacuum in the chamber to fall from an initial level of 25 inches of mercury to a subsequent level of 24 inches of mercury. In carrying out the present invention the porosity should preferably lie within a range in which this drop occurs in a time interval lying within the range of 1 to 30 seconds. In general it might be said that only a very small degree of porosity is sufficient to avoid build-up of excessive pressure in the grease-filled space 60.

It is preferred to have the porous element 15, as shown, facing the "inside" of the equipment so that if any oozing of lubricant does occur through the element, it will be safely contained. It will be understood, however, that if desired the facing of the cartridge can be reversed from that shown without sacrificing the main advantages of the invention.

The stepped washers 41, 42, in addition to providing different axial spacings to accommodate the garter spring and wave spring, respectively, are inherently rigid both by reason of the geometrical configuration and by reason of the cold working during the forming process so that the axial force developed in the wave spring may be transmitted to the wall portions of the sealing element with negligible washer deformation. This is true even though the washers are formed of mild steel stock as thin as 0.005 inch. Moreover, the inherent rigidity of the washers insures that the concentrated forces applied by the individual convolutions of the wave spring are converted to force which is uniformly distributed upon the wall portions of the sealing element so that the force at the sealing lips is absolutely constant from point to point about the periphery.

The net result is to produce a cartridge type seal which is highly reliable and efficient, which may be employed over a wide range of shaft speed, over a wide range of pressure, and with many different types of fluid.

To facilitate installation of the seal upon the shaft, the cartridge wall may be deformed to provide annular projection 58 spaced outwardly from the lip 28 to maintain the sealing element generally centered within the shell. However, sufficient radial clearance is provided to enable the sealing element to shift within the cartridge to accommodate any eccentricity of the shaft and to accommodate any "run out" or dynamic eccentricity as the shaft rotates.

While the term "rubber" has been used throughout for the sake of convenience to describe the material of which the sealing element is made, it will be understood that the term is intended to be generic and to cover synthetic or substitute resilient materials having characteristics normally attributed to rubber.

In the following claims the term "cartridge shell" shall be understood to mean any structure enclosing the rubber sealing element and providing the necessary opposed surfaces for lip engagement. The term "garter spring" shall be understood to mean any resilient element capable of exerting evenly distributed radial squeezing force. The term "wave spring" shall be understood to include any spring means in an annular locus exerting force in the axial direction. While the washers and garter spring are shown in contact in FIG. 1, it is preferred to have clearance between the members, as is clear from the view, at a larger scale, in FIG. 2.

I claim as my invention:

1. In a cartridge type seal for sealing a shaft with respect to a clearance opening, the combination comprising a stationary cartridge shell presenting axially opposed inner walls, an annular rubber sealing element of U-shaped cross section having a shaft gripping portion and two wall portions defining a deep groove between them, a garter spring seated in the root of the groove and squeezing inwardly on the shaft gripping portion for compressing the latter radially into gripping engagement with the shaft for rotation with said shaft, laterally extending sealing lips integrally formed on the wall portions for respectively engaging the inner walls of the shell, and a wave spring in the groove surrounding the garter spring and having washers on each side thereof for pressing axially outward against the wall portions for seating of the lips against said shell walls during rotation of said sealing element relative to said shell, the washers being free of any axial engagement with the garter spring, the region of connection of the wall portions to the shaft gripping portion of the element being of sufficiently thin flexible section so that the pressure at the lips is substantially independent of variations in the squeezing force exerted by the garter spring incident to changes in shaft speed.

2. The combination as claimed in claim 1 in which the washers are extended radially inward straddling the garter spring.

3. The combination as claimed in claim 2 in which the washers are of stepped construction providing a space between them at the inner diameter sufficient to accommodate the garter spring and a reduced space between them at the outer diameter for accommodating the wave spring while keeping the latter centered over the garter spring.

References Cited

UNITED STATES PATENTS

| | | | |
|---|---|---|---|
| 1,931,733 | 10/1933 | Leibing. | |
| 2,210,823 | 8/1940 | Victor et al. | 277—25 |
| 2,326,489 | 8/1943 | Payne | 277—84 X |
| 2,362,353 | 11/1944 | Cate | 277—96 X |
| 2,877,029 | 3/1959 | Peguet et al. | 277—41 |
| 3,009,717 | 11/1961 | Laser | 277—25 |
| 3,016,251 | 1/1962 | Gilbert | 277—25 X |
| 3,055,666 | 9/1962 | Moreno | 277—25 |
| 3,068,016 | 12/1962 | Dega | 277—96 |
| 3,306,620 | 2/1967 | Taschenberg | 277—84 X |

FOREIGN PATENTS 523,149   3/1954   Belgium.

JAMES KEE CHI, Primary Examiner

U.S. Cl. X.R.

277—25, 84, 95